(12) United States Patent
Sugarbroad

(10) Patent No.: US 8,387,114 B2
(45) Date of Patent: Feb. 26, 2013

(54) SECURE WORKLOAD PARTITIONING IN A SERVER ENVIRONMENT

(75) Inventor: Jean-Philippe Sugarbroad, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 12/348,046

(22) Filed: Jan. 2, 2009

(65) Prior Publication Data

US 2010/0175107 A1 Jul. 8, 2010

(51) Int. Cl.
*G06F 7/04* (2006.01)

(52) U.S. Cl. .............................................. 726/3; 726/15
(58) Field of Classification Search ................. 726/3, 15
See application file for complete search history.

(56) References Cited

U.S. PATENT DOCUMENTS

| | | | | |
|---|---|---|---|---|
| 5,721,876 | A * | 2/1998 | Yu et al. ........................... | 703/27 |
| 6,289,462 | B1 * | 9/2001 | McNabb et al. ................. | 726/21 |
| 6,751,729 | B1 | 6/2004 | Giniger et al. | |
| 7,024,686 | B2 | 4/2006 | Brawn et al. | |
| 7,984,108 | B2 * | 7/2011 | Landis et al. ................. | 709/215 |

OTHER PUBLICATIONS

Mao, Jie, et al., "Event-based Constraints for Sensornet Programming," DEBS '08, Jul. 1-4, 2008, Rome, Italy, pp. 103-113.
Borders, Kevin, et al., "Securing Sensitive Content in a View-Only File System," DRM '06, Oct. 30, 2006, Alexandria, Virginia, pp. 27-36.

* cited by examiner

*Primary Examiner* — Christopher Brown
(74) *Attorney, Agent, or Firm* — Francis Lammes; Stephen J. Walder, Jr.; John D. Flynn

(57) ABSTRACT

Generally speaking, systems, methods and computer program products for creating a secure workload partition in a server environment are disclosed. Embodiments of the method may include creating, for a process associated with a client network service, a secure workload partition within a logical partition executing in a server environment having a root partition where the secure workload partition has no network interfaces and no communication with any other workload partitions within the logical partition. Embodiments of the method may also include establishing an alternative network connection for the process within the created secure workload partition without establishing a network interface for the secure workload partition and without establishing communication with any other workload partitions within the logical partition. Embodiments of the method may also include executing the process within the secure workload partition to provide the client network service.

17 Claims, 5 Drawing Sheets

SECURE WORKLOAD PARTITIONING IN A SERVER ENVIRONMENT

BACKGROUND

Embodiments of the invention generally relate to the field of data processing systems. More particularly, embodiments relate to systems, methods, and computer program products to create secure workload partitions in a server environment. Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors.

In order to help manage the resources of a computer system, particularly server computer systems, system administrators often use logical partitions (LPARs). Administrators assign a subset of computer resources (e.g., processor capacity, memory, etc.) to a particular logical partition, which is then virtualized as a separate computer having its own operating system. Logical partitions thus allow system administrators to have multiple virtualized computers each in their own logical partition and each with its own operating system and files. Such a system provides significant flexibility and convenience for administrators, but they also require the use of significant resources such as operating system files that are inefficiently duplicated in each logical partition.

Workload partitions (WPARs) are partitions that administrators can create within a logical partition. International Business Machine's ("IBM®'s") AIX® Unix-based operating system includes the ability for administrators to create workload partitions. Workload partitioning is a method of partitioning a UNIX system such as AIX® such that it appears to an application or user to be multiple independent systems. By running each application in its own partition, applications gain some protection from functional security failures of other applications on the system. Workload partitions typically are easier to create and require fewer resources than full logical partitions as they do not require a full operating system install, among other differences. Each workload partition typically has an associated IP address and network interface, allowing clients to access the services running on each workload partition as well as allowing each workload partition to make requests on the network.

BRIEF SUMMARY

The disclosed embodiments include systems, methods, and computer program products for creating a secure workload partition in a server environment. Some embodiments may include creating, for a process associated with a client network service, a secure workload partition within a logical partition executing in a server environment having a root partition where the secure workload partition has no network interfaces and no communication with any other workload partitions within the logical partition. Embodiments may also include establishing an alternative network connection for the process within the created secure workload partition without establishing a network interface for the secure workload partition and without establishing communication with any other workload partitions within the logical partition. Embodiments may also include executing the process within the secure workload partition to provide the client network service.

Further embodiments include a computer program product comprising a computer readable storage medium including instructions that, when executed by a process, create, for a process associated with a client network service, a secure workload partition within a logical partition executing in a server environment having a root partition, where the secure workload partition has no network interfaces and no communication with any other workload partitions within the logical partition. Embodiments may also include instructions that establish an alternative network connection for the process within the created secure workload partition without establishing a network interface for the secure workload partition and without establishing communication with any other workload partitions within the logical partition. Embodiments may also include instructions that execute the process within the secure workload partition to provide the client network service.

Further embodiments may include an apparatus or other system having a root process interface module of a workload partition manager implemented in a server environment to communicate with other components of the server environment and to receive requests to create a secure workload partition for a process associated with a client network service. Embodiments of the apparatus may also include a secure workload partition manager to create secure workload partitions within a particular logical partition. The secure workload partition manager may include a secure workload partition creation sub-module to create secure workload partitions having no network interfaces and no communication with any other workload partitions. The secure workload partition manager may also include an alternative network service module to establish an alternative network connection for a process within a created secure workload partition without establishing a network interface for the secure workload partition and without establishing communication with any other workload partitions within the particular logical partition.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art having benefit of this disclosure.

Generally speaking, systems, methods and computer program products for creating a secure workload partition in a server environment are disclosed. Embodiments of the method may include creating, for a process associated with a client network service, a secure workload partition within a logical partition in a server environment having a root partition where the secure workload partition has no network interfaces and no communication with any other workload partitions within the logical partition. Embodiments of the method may also include establishing an alternative network connection for the process within the created secure workload partition without establishing a network interface for the secure workload partition and without establishing communication with any other workload partitions within the logical partition. Embodiments of the method may also include executing the process within the secure workload partition to provide the client network service. The system and methodology of the depicted embodiments allow for effective and efficient creation of a secure workload partition in a server environment. According to some embodiments, by using alternative network connections and isolating the secure workload partition from any network interfaces or other partitions, security may be advantageously increased as intruders will not be able to utilize access to a secure workload partition to improperly access other partitions of the server environment and thus cannot launch attacks over the network.

Figure 1:
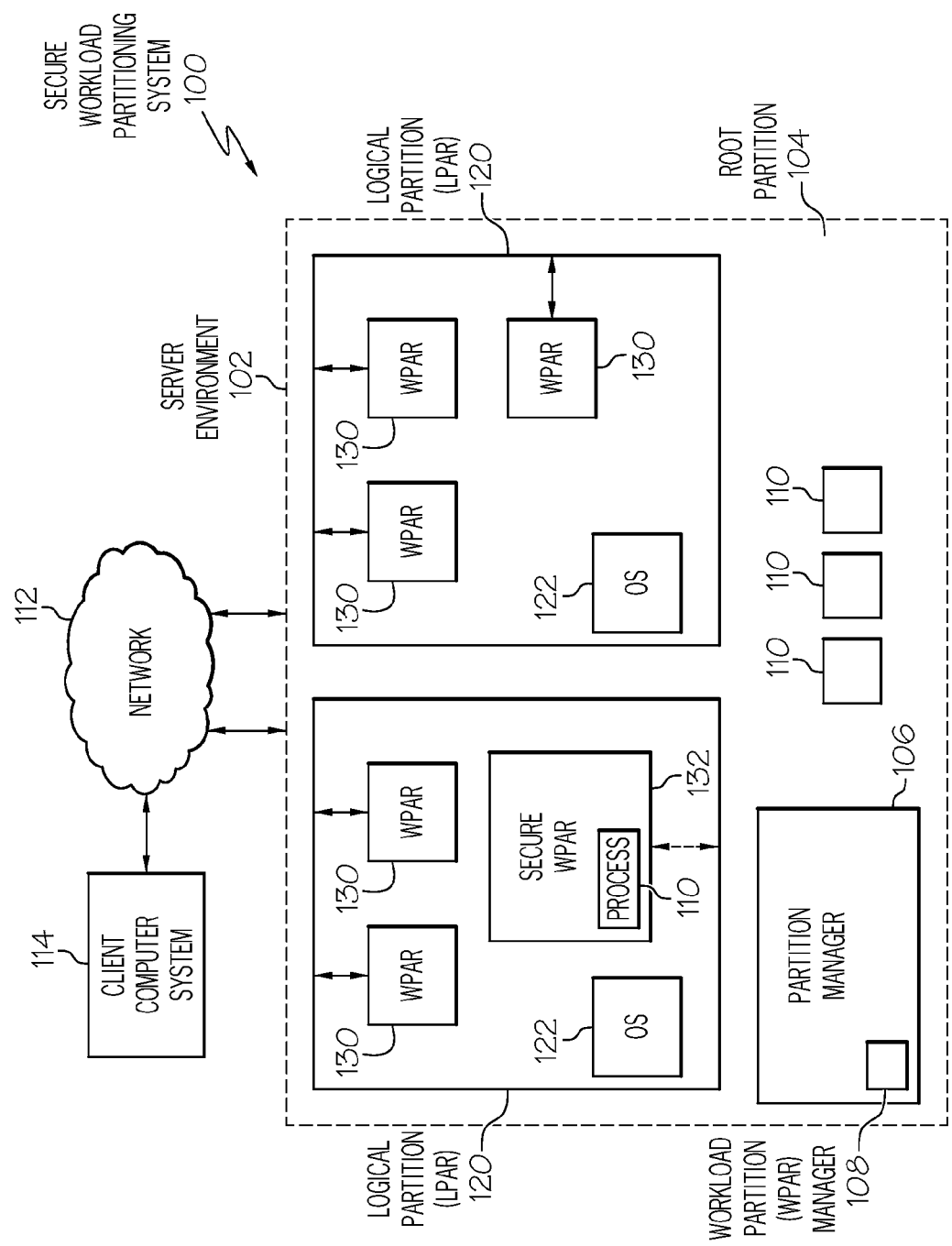
FIG. 1 depicts a block diagram of a secure workload partitioning system having a server environment, a partition manager, a workload partition manager, and one or more secure workload partitions according to some embodiments.

Turning now to the drawings, FIG. 1 depicts a block diagram of a secure workload partitioning system 100 having a server environment 102, a partition manager 106, a workload partition manager 108, and one or more secure workload partitions 132 according to some embodiments. In the depicted embodiment, the secure workload partitioning system 100 includes a server environment 102 having a root partition 104, a partition manager 106, and one or more processes 110. The partition manager 106 may create one or more logical partitions (LPARs) within the server environment 102. The server environment 102 may be in communication with one or more client computer systems 114 via a network 112 so that components of the server environment 102 may provide client network services to the client computer system(s) 114. As will be described in more detail subsequently, the partition manager 106 may include a workload partition manager 108 component which may create non-secure workload partitions 130 and/or secure workload partitions 132 within the logical partitions 120 to provide network services to various client computer systems 114.

The server environment 102 may be considered a computing environment implemented on one or more servers or other computer systems (such as those described in relation to FIG. 2) adapted to implement software such as processes 110, applications, operating systems, etc. The server environment 102 may be implemented, for example, on one or more application servers such as International Business Machine's (IBM®'s) WebSphere® Application Servers (WAS) that may serve as middleware to set up, operate, and integrate e-business applications across multiple computing platforms using Web technologies. The server environment may be executing an operating system such as UNIX, IBM®'s AIX® Unix-based operating system, or any other operating system compatible with partitioning capability. The root partition 104 may be any part of the server environment 102 that is not contained within a logical partition 120 according to some embodiments. A process 110 executing in the root partition 104 may typically have full system access. Processes 110 may be considered to be an execution of a program or command, including but not limited to all or part of an application that is executing and that provides network services to one or more clients. Processes 110 may also be executing within both non-secure workload partitions 130 and secure workload partitions 132 as client network service applications, as will be described in more detail subsequently.

The partition manager 106 may be executing in the server environment 102 and may create and manage one or more logical partitions 120 of the server environment 102. Logical partitions 120, often called LPARs, are assigned a subset of a computer's hardware resources (i.e., a subset of the hardware underlying the server environment 102) and are virtualized within the server environment 102 as a separate computer. Administrators may assign resources such as processor capacity, memory, or any other type of resource to a particular logical partition 120. Each logical partition 120 has its own operating system 122 and associated files, allowing for multiple operating systems to be simultaneously executing within the server environment 102.

The workload partition manager 108 may create and manage one or more workload partitions to be executing within a logical partition 120, including non-secure workload partitions 130 and secure workload partitions 132. The workload partition manager 108 may be wholly or partially a component of the partition manager 106 (as depicted in FIG. 1) or may be an entirely separate module. The workload partition manager 108 may create one or more workload partitions 130, 132 within a particular logical partition 120 or it may create none at all in a particular logical partition 120. The workload partition manager 108 may create non-secure, or standard, workload partitions 130 having network connectivity as required or requested. Workload partitions 130 may typically have an assigned IP address and network interface as part of its network connectivity and that allow clients to access services running in that particular logical partition 130. Such network connectivity, however, may result in security issues as a beach of security may allow an intruder to launch arbitrary attacks on other logical partitions 120 or systems on the network 112.

The workload partition manager 108 may also advantageously create secure workload partitions 132 within logical partitions 120 as described herein. To do so, the workload partition manager 108 may create secure workload partitions 132 having no network interfaces and no communication with any other workload partitions 132 (and thus no assigned IP address), effectively isolating each secure workload partition 132 from other partitions. To establish communication with a client, the workload partition manager 108 may establish an alternative network connection for a network service process 110 within created secure workload partitions 132 without establishing a network interface for the secure workload partition 132 and without establishing communication with any other workload partitions 132 within the particular logical partition 120. The workload partition manager 108 may establish the alternative network connection for a process 110, as will described in more detail subsequently in relation to FIGS. 3 and 5, by passing a socket or process directly into the secure workload partition 132 for use by its embedded process 110. This avoids the need to provide direct access to network 112 to the secure workload partition 132 via a network interface. By passing the socket or process through these "holes" which are effectively one-way, improved security may be achieved for the isolated secure workload partition 132.

Network 112 may be any type of data communications channel or combination of channels, such as the Internet, an intranet, a LAN, a WAN, an Ethernet network, a wireless network, telephone network, a proprietary network, or a broadband cable network. In one example, the Internet may serve as network 112 and the client computer systems 114 and components of the server environment 102 may communicate via the Internet using known protocols. Those skilled in the art will recognize, however, that the embodiments described herein may be implemented utilizing any type or combination of data communications channel(s).

Users may utilize a client computer system 114 according to the present embodiments to access the client network services provided by components of the server environment 102 via network 112. Client computer system 114 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2 according to one embodiment. A user of the client computer system 114 may thus request client network services and interact with various network service applications executing within partitions (logical or workload) of the server environment 102. Client network service applications (i.e., processes 110) may execute within a logical partition 110 or workload partition 130, 132 according to some embodiments to provide a network service application over the network 112 to clients using client computer systems 114.

Figure 2:
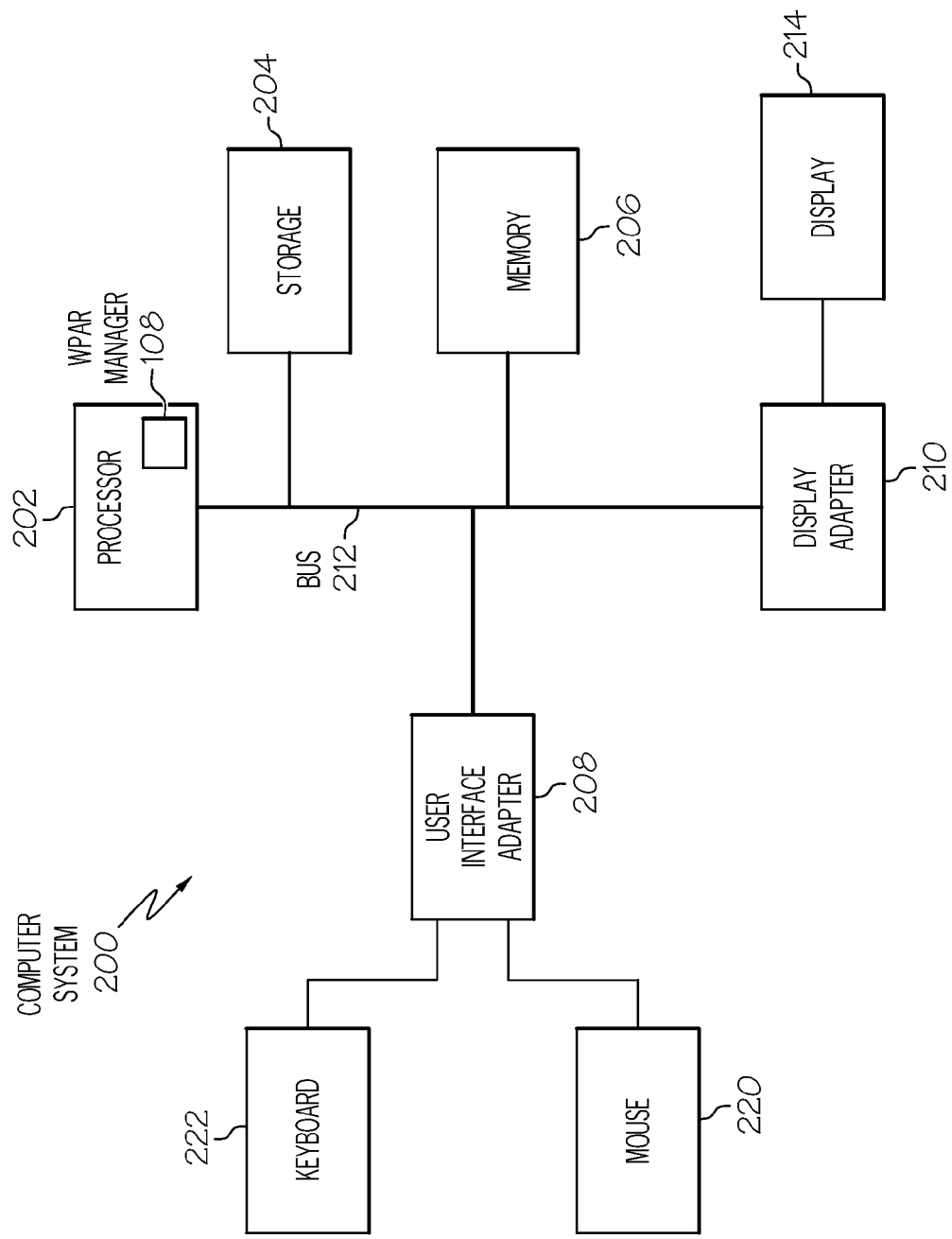
FIG. 2 depicts a block diagram of one embodiment of a computer system suitable for components or executing components of the secure workload partitioning system, such as for a client computer system or a server that is part of the server environment.

FIG. 2 depicts a block diagram of one embodiment of a computer system 200 suitable for components or executing components of the secure workload partitioning system 100, such as for a client computer system 114 or a server that is part of the server environment 102. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the workload partition manager 108, such as by receiving requests to create a workload partition 130, 132 or by creating a secure workload partition 132 within a logical partition 120. All or part of the workload partition manager 108, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client computer system 114 attempting access to a request a client network service, for example, may utilize the keyboard 222 and mouse 220 to interact with their computer system. The bus 212 may also connect the processor 202 to a display 214, such as an LCD display or CRT monitor, via the display adapter 210.

Figure 3:
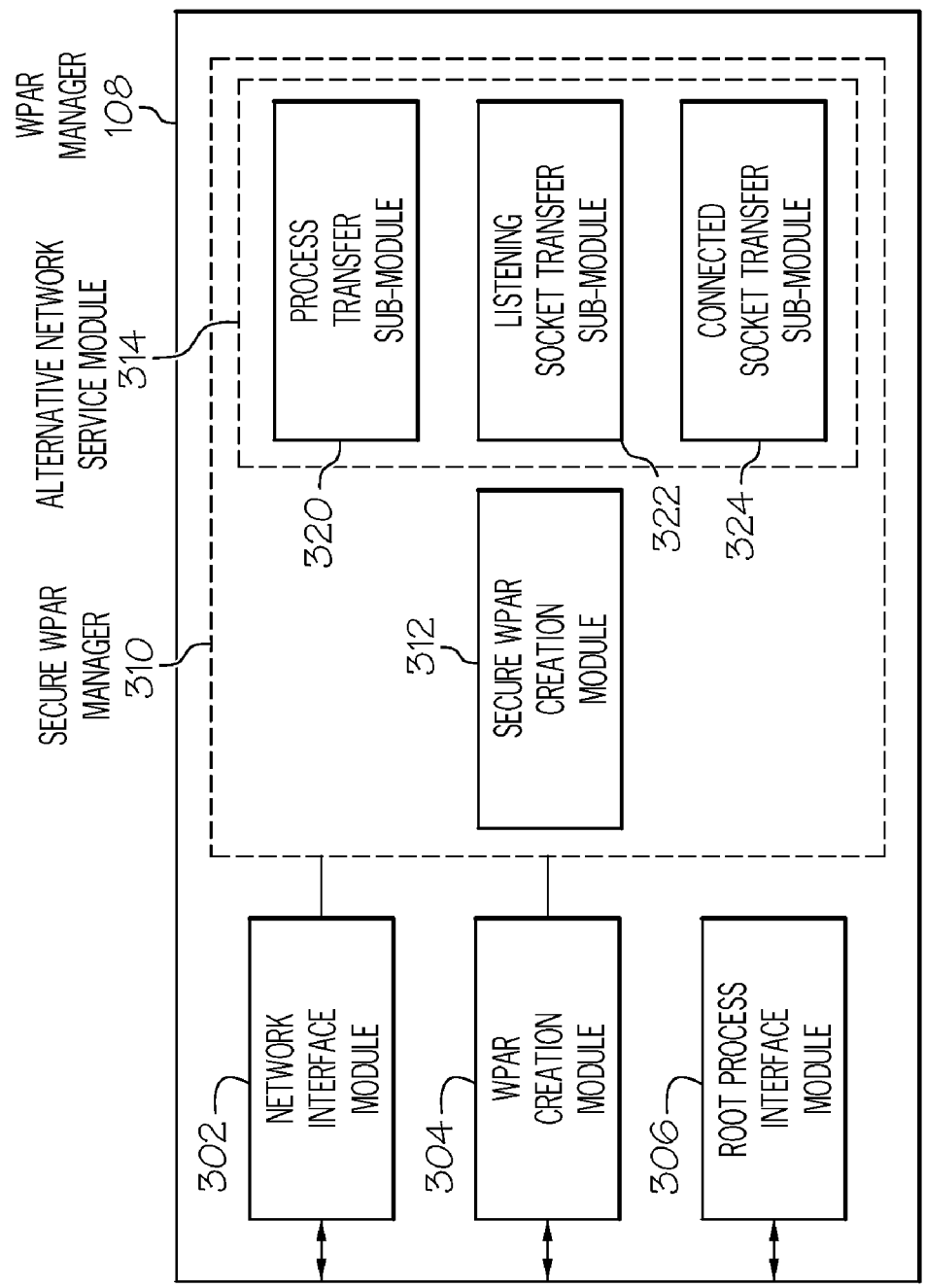
FIG. 3 depicts a block diagram of software components of a workload partition manager according to some embodiments.

FIG. 3 depicts a block diagram of software components of a workload partition manager 108 according to some embodiments. The workload partition manager 108 may be implemented on a computer system 200 such as described in relation to FIG. 2, including on one or more servers executing all or part of the server environment 102. As described previously and also in relation to FIGS. 4 and 5, the workload partition manager 108 may create non-secure workload partitions 130 and/or secure workload partitions 132 within the partitioned server environment 102 to facilitate provision of client network services. The workload partition manager 108 may include components to assist it with its functions, including a network interface module 302, a workload partition creation module 304, a root process interface module 306, and a secure workload partition manager 310. The secure workload partition manager 310 may include its own components, such as a secure workload partition creation module 312 and an alternative network service module 314. One skilled in the art will recognize that the functionality of each component of the workload partition manager 108 may be combined or divided in any fashion and the description herein is merely intended to be illustrative of some embodiments.

The network interface module 302 may facilitate communication between the workload partition manager 108 and various client computer systems 114 over the network 112. In some embodiments, the network interface module 302 may receive requests for network services from a client computer system 114. After receiving such requests, the network interface module 302 may pass an indication of the request to a workload partition creation module 304 or secure workload partition manager 310 as appropriate.

The workload partition creation module 304 may create, within a particular logical partition 120, one or more non-secure workload partitions 130 having network connectivity. Network connectivity for a standard (i.e., non-secure) workload partition 130 may be based on a an assigned IP (Internet Protocol) address such that the workload partition 130 has a network interface with which it may directly communicate with client computer systems 114. As discussed previously, such a direct network interface also allows an intruder to potentially launch arbitrary attacks on other partitions or systems over the network 112. The workload partition creation module 304 may also reconfigure or remove created workload partitions 130 according to some embodiments.

The root process interface module 306 may communicate with other components of the server environment 102 and may also receive requests to create a secure workload partition 132 for a process 110 associated with a client network service. The root process interface module 306 may thus provide for communication between the workload partition manager 108 and other components of the server environment 102.

The secure workload partition manager 310 may create and otherwise manage one or more secure workload partitions 132 within a particular logical partition 120 and may use its components, the secure workload partition creation module 312 and an alternative network service module 314, to assist in its tasks. The secure workload partition creation module 312 may create secure workload partitions 132 having no network interfaces and no communication with any other workload partitions 132. The created secure workload partitions 132 help improve security in the face of unauthorized intruders because the lack of network interface and assigned IP address limits the ability for an attacker to impact other partitions. As will be described in more detail below, network connectivity for a created secure workload partition 132 is established instead by an alternative network service or connection that does not allow an intruder to attack other partitions. The secure workload partition creation module 312 may also reconfigure or remove created secure workload partitions 132 according to some embodiments.

The alternative network service module 314 may establish an alternative network connection for a process 110 within created secure workload partitions 132 without establishing a network interface for the secure workload partition 132 and without establishing communication with any other workload partitions 130, 132 within the particular logical partition. This may help improve security by restricting the ability for an attacker to reach other partitions beyond the particular secure workload partition 132. The alternative network service module 314 may include its own sub-modules as well to assist it in its tasks, including a process transfer sub-module 320, a listening socket transfer sub-module 322, and a connected socket transfer sub-module 324.

A socket may be considered, in some embodiments, to be a UNIX domain socket, a socket which may be used between processes 110 on the same UNIX system. The data on UNIX domain sockets may contain in-flight file descriptors which may be restored when an application is ready to read them. A file descriptor may be considered a value used by a process 110 to identify an open file. A file descriptor may facilitate a process 110 performing a read and write over a network 112 because the file descriptor may point to a file on a disk or point to a socket that is open in the kernel. The kernel may maintain a file descriptor table for each process 110 and may translate the file descriptor to the open file or socket. A file descriptor entry in the file descriptor table may include a file pointer which references the location or address of the open file or socket.

The secure workload partition manager 310 may facilitate "branding" of processes whereby a process 110 running the in the root partition 104 may request that it be placed in a particular partition. This procedure would be akin to the 'setuid' system call in UNIX according to some embodiments. Components of the alternative network service module 314 may use branding to help establish alternative communications for created secure workload partitions 132 according to some embodiments.

The process transfer sub-module 320 may create a child process 110 within a root partition 104 of the server environment 102, brand the created child process 110 into a created secure workload partition 132 based on a file descriptor for the created child process 110, and close any other open file descriptors for the child process 110. The process transfer sub-module 320 may first create the child process 110 within the root partition 104 in response to a request for service received via network 112 from a client computer system 114. Before performing any communication with the requesting client computer system 114, the process transfer sub-module 320 brands the new process 110 into the created secure workload partition 132 and then closes all other file descriptors. The process transfer methodology implemented by the process transfer sub-module 320 is relatively simple and may be implemented, according to some embodiments, by slightly modifying the 'inetd' process running on most UNIX systems.

The listening socket transfer sub-module 322 may open a listening socket, brand the opened listening socket into a created secure workload partition 132, and to execute a process 110 utilizing the opened listening socket to service client requests. The listening socket transfer method provides for running a listening process inside the secure workload partition 132 as part of the application performing the client service, instead of having the listening process run outside of the secure workload partition 132. The listening socket transfer sub-module 322 may have a launcher that opens the listening socket, brands itself into the secure workload partition 132, and then executes the application or other process 110. The application in this embodiment will run inside of the secure workload partition 132 but still be able to service client requests via listening socket pre-created by the launcher. The listening socket transfer methodology is more complex than the process transfer methodology as it requires a launcher program or modification to a subsystem that starts the server, but requires no modification of the server program itself.

The connected socket transfer sub-module 324 may create a connected pair of sockets having a first socket and a second socket, pass the first socket of a connected pair of sockets to a process by branding the first socket into a created secure workload partition 132, and transfer a connection from the second socket to the first socket. In some embodiments, the connected socket transfer sub-module transfers the connection from the second socket to the first socket in response to a determination that the connection needs to be serviced by a process 110. The connected socket transfer method is more flexible than the listening socket transfer while still avoiding the process creation of the process transfer methodology. At application start, according to some embodiments, a connected pair of UNIX sockets is created via the socketpair system call and one of them may be passed to the application when it is started in the secure workload partition 132, similarly to the listening socket transfer method. When it is determined that a connection needs to be serviced by the application, it can be transferred to the application by an SCM_RIGHTS message in UNIX. SCM_RIGHTS is a UNIX mechanism whereby a socket can be transferred from one process to another. Of the disclosed methodologies, connected socket transfer is the most complex as it requires modifications to both the startup and the application, but it does permit fine-grained determination of which connections to service. For example, the connected socket transfer sub-module 324 may permit some initial negotiation done over the socket and it also may permit outgoing connections to be transferred to the application.

While the disclosed alternative network connection methodologies have their own strength and weaknesses, each provides that, in the event the security of a network service application is breached, the intruder will not have access to anything other than the contents of that particular secure workload partition 132. The 'hole' of the listening/transfer socket is effectively one-way (i.e., into the secure workload partition 132) and so cannot be used to launch attacks over the network 112 if security of a particular secure workload partition 132 is breached. The alternative network service module 314 may utilize any or all of the disclosed alternative network connection methodologies, as well as any other methodologies, and may use any logic or factors to assist it in determining which methodology should be used for a particular process 110.

Figure 4:
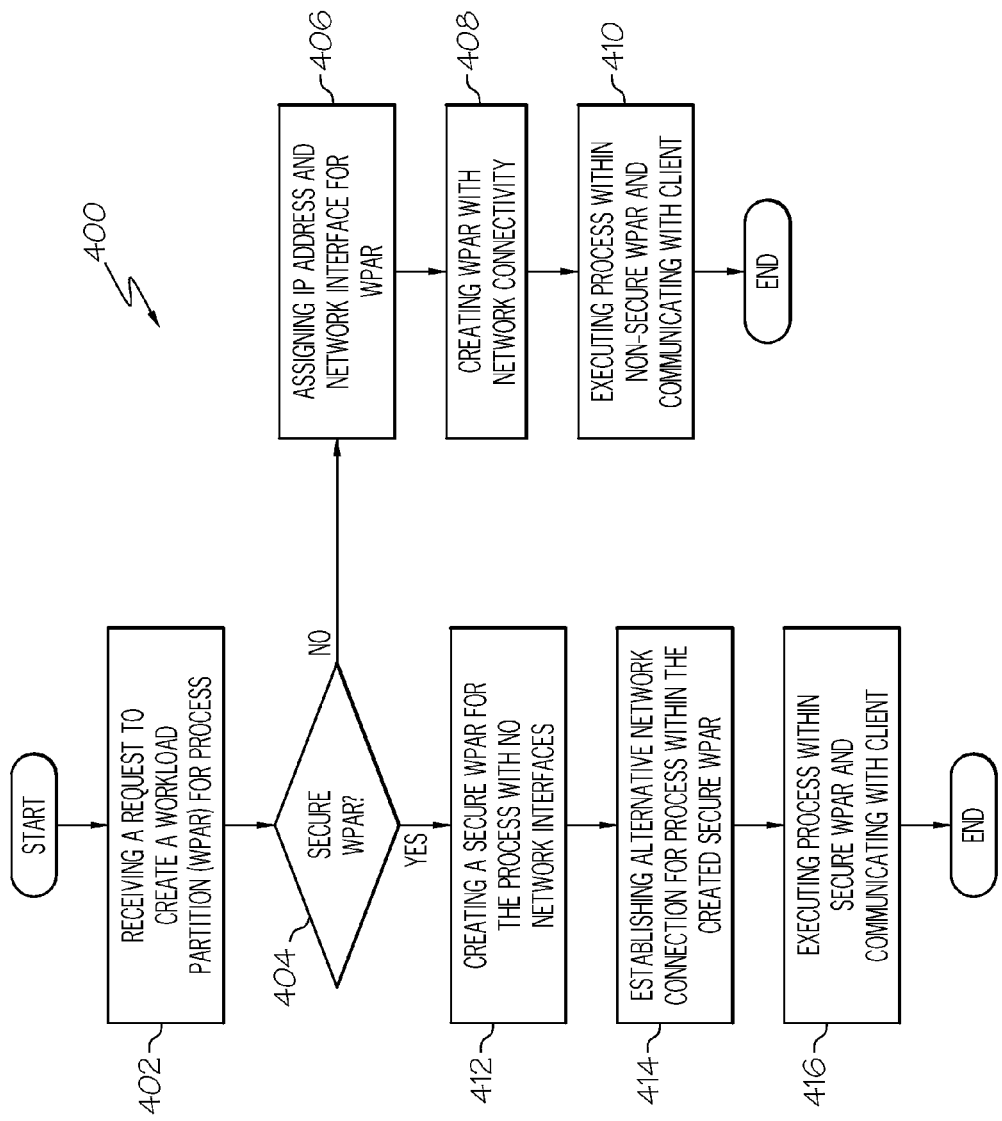
FIG. 4 depicts an example of a flow chart for creating secure workload partitions and non-secure workload partitions according to some embodiments.

FIG. 4 depicts an example of a flow chart 400 for creating secure workload partitions 132 and non-secure workload partitions 130 according to some embodiments. For example, one or more embodiments may be implemented as a computer program product comprising a computer readable storage medium including instructions that, when executed by a processor generate, in an automated fashion, create either or both of a secure workload partition 132 and a non-secure workload partition 130. Components of a workload partition manager 108 may perform all or part of the tasks of flow chart 400, as described in more detail in relation to FIG. 3.

As illustrated in FIG. 4, the method may begin at element 402 by receiving a request to create a workload partition for a client network service (and thus the process 110 associated for the requested client network service). The workload partition manager 108 may receive such a request, for example, from a client computer system 114 or another component of the server environment 102. The method may then continue to decision block 404 to determine whether a secure workload partition 132 or a non-secure workload partition 130 should be created within a particular logical partition 120. If a secure workload partition 132 will not be created and a regular, non-secure workload partition 130 will instead be created, the method may continue to element 406, assigning an IP address and other network interface parameters for the workload partition 130 to be created. The workload partition manager 108 may then at element 408 create the workload partition 130 within the logical partition 120. The created workload partition 130 may have a network interface based on the assigned IP address to facilitate communication with client computer systems 114 utilizing the client network service. The workload partition manager 108 may then at element 410 execute the process 110 associated with the client network service application within the created non-secure workload partition 130, after which the process may terminate. The client network service application may then also begin communication with clients on client computer systems 114 as part of a client network service.

If, at decision block 404, the workload partition manager 108 determines to create a secure workload partition 132 for the process 110, the method continues to element 412 by creating a secure workload partition 132 for the process 110 with no network interfaces and no communication with any other workload partitions 130, 132, secure or otherwise, within the logical partition 120. The workload partition manager 108 may then at element 414 establish an alternative network connection for the process 110 within the created secure workload partition 132, as described previously in relation to FIG. 3 and as will be described in more detail subsequently in relation to FIG. 5. The workload partition manager 108 may establish the alternative network connection without establishing a network interface for the secure workload partition 132 and without establishing communication with any other workload partitions 130, 132 within the logical partition 120. The workload partition manager 108 may then execute the process 110 within the created secure workload partition 132 at element 416, after which the method may terminate. The client network service application may then also begin communication with clients on client computer systems 114 as part of a client network service.

Flowchart 400 of FIG. 4 illustrates only one method. Alternative embodiments may implement innumerable variations of flowchart 400. For example, instead of determining whether a secure workload partition 132 should be created instead of a non-secure workload partition 130, the method may instead assume that a secure workload partition 132 is required and the workload partition manager 108 may create such secure workload partitions 132 only, eliminating the need for decision block 404 and elements 406, 408, and 410. In another example, the functions of elements 412 and 414 may be combined into a single step as the workload partition manager 108 simultaneously creates the secure workload partition 132 and establishes its alternative network connection. Other variations, with more elements and fewer or different elements, are possible for alternative embodiments.

Figure 5:
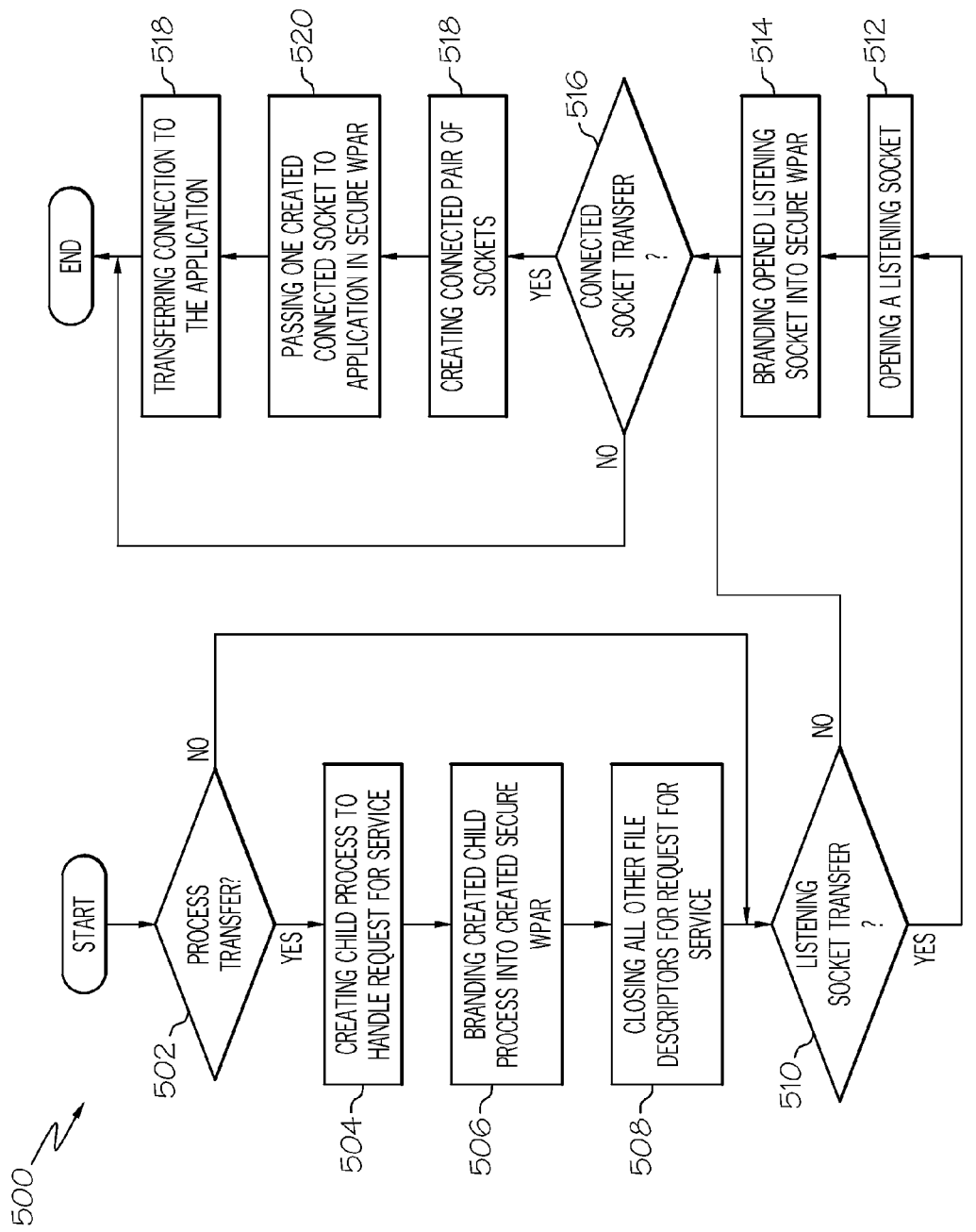
FIG. 5 depicts an example of a flow chart for establishing an alternative network connection for a process within a secure workload partition according to some embodiments.

FIG. 5 depicts an example of a flow chart 500 for establishing an alternative network connection for a process 110 within a secure workload partition 132 according to some embodiments. One or more embodiments may be implemented as a computer program product comprising a computer readable storage medium including instructions that, when executed by a processor generate, in an automated fashion, establish an alternative network connection for a process 110 within a secure workload partition 132. Components of a workload partition manager 108 such as the alternative network service module 314 may perform all or part of the tasks of flow chart 500, as described in more detail in relation to FIG. 3. Flow chart 500 may also represent an example of element 414 of flow chart 400 of FIG. 4 of some possible alternative network connections according to some embodiments.

As illustrated in FIG. 5, the method may begin at decision block 502 where the method determines whether the workload partition manager 108 will create the alternative network connection using a process transfer method. If so, the workload partition manager 108 may, at element 504, create a child process 110 within a root partition 104 of the server environment 102 to handle a request for service and in response to a request for service received via network 112 from a client computer system 114. The workload partition manager 108 may then, at element 506, brand the created child process 110 into a created secure workload partition 132 based on a file descriptor for the created child process, and, at element 508, close any other open file descriptors for the child process 110.

The workload partition manager 108 may at decision block 510 determine whether it will use the listening socket transfer methodology to create the alternative network connection. If so, the workload partition manager 108 may, at element 512, open a listening socket. The workload partition manager 108 may also at element 514 brand the opened listening socket into a created secure workload partition 132 and to execute a process 110 utilizing the opened listening socket to service client requests. The workload partition manager 108 may utilize a launcher executing in the root partition 104 to perform elements 512 and 514 according to some embodiments.

The workload partition manager 108 may at decision block 510 determine whether it will use the connected socket transfer methodology to create the alternative network connection. If so, the workload partition manager 108 may, at element 518, create a connected pair of sockets having a first socket and a second socket, such as by creating a pair of UNIX sockets via the 'socketpair' system call. The workload partition manager 108 may also at element 520 pass the first socket of the connected pair of sockets to a process 110 by branding the first socket into a created secure workload partition 132. The workload partition manager 108 may also at element 518 transfer a connection from the second socket to the first socket and thus establish a network connection for the process 110, such as by an SCM_RIGHTS message in UNIX, after which the method may terminate.

Flowchart 500 of FIG. 5 illustrates only one method. Alternative embodiments may implement innumerable variations of flowchart 500. A workload partition manager 108 may typically choose only one of the disclosed methods to create an alternative network connection and flowcharts 500 with only one of the methods may be used. In other embodiments, the workload partition manager 108 may utilize any sort of logic and factors to determine which alternative network connection should be used. Moreover, while three different alternative network connection methodologies are disclosed herein, one skilled in the art will recognize that other methodologies may also be used to establish such a connection, even if those methodologies are later developed. Other variations, with more elements and fewer or different elements, are possible for alternative embodiments.

As will be appreciated by one skilled in the art, aspects of various embodiments may be embodied as a system, method or computer program product. Embodiments may be implemented as a program product for implementing systems and methods described with reference to FIGS. 1-5. Embodiments may take the form of an entirely hardware embodiment, an entirely software embodiment (including firmware, resident software, micro-code, etc.), or an embodiment containing both hardware and software elements that may all generally be referred to herein as "circuit," "module" or "system". Furthermore, embodiments may take the form of a computer program product embodied in any tangible medium of expression having computer-usable program code embodied in the medium. For the purpose of describing the various embodiments, a computer-usable or computer readable medium may be any apparatus that can contain, store, communicate, propagate, or transport the program for use by or in connection with the instruction execution system, apparatus, or device.

Any combination of one or more usable or computer readable medium(s) may be utilized. The computer-usable or computer-readable medium may be, in a non-limiting set of examples, an electronic, magnetic, optical, electromagnetic, infrared, or semiconductor system, apparatus, device or propagation medium. Non-limiting examples of a computer-readable medium include an electrical connection having one or more wires, a portable computer diskette, a hard disk, a random access memory (RAM), a read-only memory (ROM), an erasable programmable read-only memory (EPROM or Flash memory), an optical fiber, a transmission media such as those supporting the Internet or an intranet, an optical disk, or a magnetic storage device. Current examples of optical disks include compact disk-read only memory (CD-ROM), compact disk-read/write (CD-R/W), and DVD. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of various embodiments may be written in any combination of one or more programming languages, including object oriented programming languages such as Java, Smalltalk, C++ or the like and conventional programming languages such as the "C" programming languages. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and or block diagram block(s). The computer program instructions may also be loaded onto a computer or other programmable data processing apparatus to cause a series of operations steps to be performed on the computer or other programmable apparatus to produce a computer implemented process such that the instructions which execute on the computer or other programmable apparatus provide processes for implementing the functions/acts specified in the flowchart and/or block diagram block(s).

The flowchart and block diagram in the Figures herein illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order indicated in the Figures or not at all. For example, two blocks shown in succession may, in fact be executed substantially concurrently, or the blocks may sometimes be executed in the reverse order, depending on the functionality involved. It will also be noted that each block of the block diagrams and/or flowchart illustrations, and combinations thereof, can be implemented on special purpose hardware-based systems that perform the specified functions or acts, or combinations of special purpose hardware and computer instructions.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers. Moreover, embodiments may also be implemented via parallel processing using a parallel computing architecture, such as one using multiple discrete systems (e.g., plurality of computers, etc.) or an internal multiprocessing architecture (e.g., a single system with parallel processing capabilities).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is intended that the following claims be interpreted broadly to embrace all the variations of the example embodiments disclosed. Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    creating, for a process associated with a client network service by a secure workload partition manager executed by a processor, a secure workload partition within a logical partition executing in a server environment having a root partition, wherein the secure workload partition is created without an internet protocol (IP) address;
    establishing, by the secure workload partition manager, a socket connection for the process within the secure workload partition, wherein establishing the socket connection for the process within the secure workload partition comprises:
        creating, by the secure workload partition manager, the process within the root partition of the server environment;
        branding, by the secure workload manager, the process into the secure workload partition based on a file descriptor for the process, wherein branding the process comprises transferring the process from the root partition to the secure workload partition;
        determining, by the secure workload partition manager, whether one or more other open file descriptors exist for the process other than the file descriptor; and
        responsive to one or more other open file descriptors existing, closing, by the secure workload partition manager, the one or more other open file descriptors for the process; and
    executing, by the secure workload manager, the process within the secure workload partition to provide the client network service utilizing the socket connection.

2. The method of claim 1 further comprising:
    receiving, by the secure workload partition manager, a request to create the secure workload partition for the process.

3. The method of claim 1, further comprising:
    communicating, by the process, with a client of the client network service via the socket connection.

4. The method of claim 1, wherein the process is an application that provides network services to one or more clients.

5. The method of claim 1, wherein establishing the socket connection for the process comprises:
    opening, by the secure workload partition manager, a listening socket;
    branding, by the secure workload partition manager, the listening socket into the process in the secure workload partition; and
    wherein executing the process within the secure workload partition comprises executing the process utilizing the listening socket to service client requests.

6. The method of claim 1, wherein establishing the socket connection for the process comprises:
    creating, by the secure partition manager, a connected pair of sockets in the root partition of the server environment having a first socket and a second socket;
    passing, by the secure workload partition manager, the first socket of the connected pair of sockets to the process by branding the first socket into the process in the secure workload partition; and
    transferring, by the secure workload partition manager, a connection from the second socket to the first socket.

7. A computer program product comprising:
    a computer readable storage device including instructions that, when executed by a processor:
    create, for a process, associated with a client network service, a secure workload partition within a logical partition executing in a server environment having a root partition, wherein the secure workload partition is created without an internet protocol (IP) address;
    a socket connection for the process within the secure workload partition, wherein establishing he socket connection for the process within the secure workload partition comprises:
        create the process within the root partition of the server environment;
        brand the process into the secure workload partition based on a file descriptor for the process, wherein branding the process comprises transferring the process from the root partition to the secure workload partition;

determine whether one or more other open file descriptors exist for the process other than the file descriptor; and responsive to one or more other open file descriptors existing, close the one or more other open file descriptors for the process; and execute the process within the secure workload partition to provide the client network service utilizing the socket connection.

8. The computer program product of claim 7, further comprising instructions that receive a request to create the secure workload partition for the process.

9. The computer program product of claim 7, wherein the instructions to establish the alternative network connection for the process further comprises instructions that, when executed by a processor:

open a listening socket;

brand the listening socket into the process in the secure workload partition; and wherein the process execute instructions further comprise instructions that, when executed by a process, execute the process utilizing the listening socket to service client requests.

10. The computer program product of claim 7, wherein the instructions to establish the alternative network connection for the process further comprises instructions that, when executed by a processor:

create a connected pair of sockets in the root partition of the server environment having a first socket and a second socket;

pass the first socket of the connected pair of sockets to the process by branding the first socket into the process in the secure workload partition; and transfer a connection from the second socket to the first socket.

11. An apparatus, comprising:

a processor, and a memory coupled to the processor, wherein the memory comprises instructions which, when executed by the processor, cause the processor to:

created a secure workload partition within a logical partition executing in a server environment having a root partition, wherein the secure workload partition is created without an internet protocol (IP) address;

establish an socket connection for the process within the secure workload partition, wherein establishing the socket connection for the process within the secure workload partition comprises:

create the process within the root partition of the server environment;

brand the process into the secure workload partition based on a file descriptor for the process, wherein branding the process comprises transferring the process from the root partition to the secure workload partition;

determine whether one or more other open file descriptors exist for the process other than the file descriptor; and responsive to one or more other open file descriptors existing, close the one or more other open file descriptors for the process; and execute the process within the secure workload partition to provide the client network service utilizing the socket connection.

12. The apparatus of claim 11, wherein the memory comprises instructions which, when executed by the processor, cause the processor to:

facilitate communication between the secure workload partition and client computer systems over a network.

13. The apparatus of claim 11, wherein the instructions further cause the processor to:

create, within a particular logical partition, non-secure workload partitions having network connectivity.

14. The apparatus of claim 11, wherein instructions further cause the processor to:

open a listening socket brand the listening socket into the process in the secure workload partition; and execute the process utilizing the listening socket to service client requests.

15. The apparatus of claim 11, wherein the instructions further cause the processor to;

create a connected pair of sockets in the root partition of the server environment having a first socket and a second socket;

pass the first socket of the connected pair of sockets to the process by branding the first socket into the process in the secure workload partition; and transfer a connection from the second socket to the first socket.

16. The apparatus of claim 15, wherein the connection from the second socket to the first socket is transferred in response to determination that the connection needs to be serviced by the process.

17. The apparatus of claim 11, wherein the process is an application that provides network services to one or more clients.

* * * * *